United States Patent [19]

Perry et al.

[11] Patent Number: 5,567,396

[45] Date of Patent: *Oct. 22, 1996

[54] FLUIDS MIXING AND DISTRIBUTING APPARATUS

[75] Inventors: George K. Perry; John C. Strickland, both of Houston, Tex.

[73] Assignee: Texaco Inc., White Plains, N.Y.

[*] Notice: The term of this patent shall not extend beyond the expiration date of Pat. No. 5,403,560.

[21] Appl. No.: 334,670

[22] Filed: Nov. 4, 1994

Related U.S. Application Data

[63] Continuation-in-part of Ser. No. 61,605, May 13, 1993, Pat. No. 5,403,560.

[51] Int. Cl.[6] ........................................................ B01J 8/04
[52] U.S. Cl. ........................... 422/190; 422/191; 422/220; 239/146; 261/97
[58] Field of Search ..................................... 422/188–191, 422/194, 195, 220, 224, 310; 208/48 Q, 146; 239/590, 597, 598; 261/97, 98

[56] References Cited

U.S. PATENT DOCUMENTS

| | | | |
|---|---|---|---|
| 3,342,193 | 9/1967 | Deering et al. | 239/590 |
| 3,433,600 | 3/1969 | Christensen et al. | 422/191 |
| 3,498,755 | 3/1970 | Borre | 422/191 |
| 3,524,731 | 8/1970 | Effron et al. | 422/195 |
| 3,541,000 | 11/1970 | Hanson et al. | 208/108 |
| 3,556,737 | 1/1971 | Borre | 422/191 |
| 3,598,541 | 8/1971 | Hennemuth et al. | 422/191 |
| 3,746,515 | 7/1973 | Friedman | 422/191 |
| 3,787,189 | 1/1974 | Muffat et al. | 422/310 |
| 3,824,080 | 7/1974 | Smith et al. | 422/191 |
| 3,824,081 | 7/1974 | Smith et al. | 422/310 |
| 3,966,420 | 6/1976 | Pegels et al. | 422/191 |
| 4,087,252 | 5/1978 | Strahorn et al. | 422/231 |
| 4,133,645 | 1/1979 | Scott | 422/220 |
| 4,138,327 | 2/1979 | Scott | 208/146 |
| 4,233,269 | 11/1980 | Kaye et al. | 422/207 |
| 4,378,292 | 3/1983 | Haase | 210/266 |
| 4,481,105 | 11/1984 | Chou | 208/146 |
| 4,669,890 | 6/1987 | Peyrot | 366/341 |
| 4,808,350 | 2/1989 | Robbins et al. | 261/96 |
| 5,152,967 | 10/1992 | Rossetti et al. | 422/194 |

FOREIGN PATENT DOCUMENTS 1353637  5/1974  United Kingdom .

*Primary Examiner*—Timothy McMahon
*Attorney, Agent, or Firm*—Kenneth R. Priem; Richard A. Morgan

[57] ABSTRACT

Internal components for a vertical downflow reactor include a closed-ended conduit having an internal baffle and longitudinal exit slots proximate its closed end for the symmetrical introduction of quench fluid into a quench zone. An interzone mixing configuration is in vertical communication with the bottom of the quench zone. An inwardly sloping collector tray has an opening concentric with the vertical axis of the reactor vessel. A mixing device is provided for mixing the liquid and vapor components entering from above the collector tray and conveying the mixed vapor and liquid downwardly through the opening. Flow deflectors are positioned immediately below the collector tray opening for directing liquid flow towards the axial centerline of the reactor. The flow deflectors take the form of four pie-shaped plates which are configured to collectively occupy between 25 to 75 percent of the concentric circular opening the collector tray and may slope downwardly at an angle of from about 30° to about 60° from the horizontal. A collection pan is positioned below and in axial alignment with the collector tray to capture and retain the liquid. A radially outwardly flared downwardly extending skirt is provided to disperse the liquid flowing from the collector pan toward the reactor walls. A continuous vertical spiral weir is provided on the surface of the collector tray to add residence time to the liquid on the tray for mixing of the liquid thereon.

10 Claims, 4 Drawing Sheets

FLUIDS MIXING AND DISTRIBUTING APPARATUS

CROSS REFERENCE TO RELATED APPLICATION

This application is a continuation-in-part of application Ser. No. 08/061,605 filed May 13, 1993 now U.S. Pat. No. 5,403,560.

BACKGROUND OF THE INVENTION

1. Field of the Invention

The present invention relates to fluids mixing and distributing apparatus for vertical downflow reactors. More particularly, the present invention relates to novel reactor internal components which effect improved quench fluid distribution within a vapor-liquid reaction mixture from a first catalyst zone, and a more uniform mixing and redistribution of liquid reactant and vapor reactant prior to their introduction to a second catalyst zone.

2. Description of the Prior Art

Vertical downflow reactors to which the present inventions relate find particular application in a variety of continuous processes wherein vapor-liquid mixture is contacted with a solid catalyst. In many processes, such reactions are exothermic and release substantial amounts of heat. Commonly such reactors for exothermic reactions are designed with a plurality of catalyst zones, each containing solid catalyst, in vertical alignment one with the other. For such exothermic reactions, it is known to provide means between catalyst zones so that a quench fluid at a relatively low temperature may be injected into the reactor vessel to mix with a vapor-liquid reaction mixture from one catalyst zone to absorb excess heat from the reaction mixture before it enters a succeeding catalyst zone.

Such quench fluids may be inert gases, liquids which are unreactive under the reaction conditions, or liquid components of the reaction mixture. The quench fluid may be a vapor component of the reaction mixture and, if so, it replaces a portion of the vapor reactant consumed in the preceding catalyst zone. By means of the quench fluid, a selected ratio of vapor to liquid reactants may be maintained in the reactor vessel as well as controlling the reaction temperature.

Vertical downflow reactors find particular application in processes wherein petroleum oils are reacted in the presence of hydrogen, such as hydrotreating processes for conversion of sulfur and nitrogen components of petroleum oils and hydrocracking processes for conversion of relatively high molecular weight hydrocarbons into lower molecular weight hydrocarbons. Such reactions of petroleum oils with hydrogen are referred to herein as hydrotreating reactions, and such term is intended to include both hydrogen treating for removal of impurities and hydrocracking for reduction of molecular weight. In hydrotreating distillates and heavy oils, such as reduced crudes, residual oils, and vacuum gas oils, vertical down flow reactors having a plurality of catalyst zones are commonly employed. As such hydrotreating reactions are exothermic, it is common practice to inject a hydrogen quench stream into a quench zone between catalyst zones, thereby controlling the reaction temperature within a desired range. Additionally the quench stream maintains the ratio of hydrogen to hydrocarbon at a desirably high value. Heavy oils, when treated at elevated temperatures, have a tendency to thermally crack, forming high molecular weight carbonaceous materials and solid coke. Such thermal cracking is in some degree time dependent. Consequently, it is desirable, within a reactor for treating heavy oils, that no area be available where liquid may stand stagnant for extended time periods at elevated temperatures. Areas of hot, stagnant liquid, in addition to undergoing additional thermal cracking with time, provide areas for carbonaceous deposits to accumulate. Such accumulations of carbonaceous deposits may interfere with flow of reactants through the reactor, and under severe conditions may plug the reactor, preventing all flow therethrough.

The art discloses many constructions for the introduction of a fluid into a reaction mixture for cooling and for effecting thorough mixing of vapor and liquid reaction mixture components to reduce temperature variations across the horizontal cross-section of the reactor, e.g., catalyst bed, through which such reaction mixture flows.

Of particular interest are related U.S. Pat. Nos. 3,824,080 and 3,824,081, both assigned to the assignee of the present application. U.S. Pat. No. 3,824,080 discloses a vertical, downflow reactor having reactor internal parts located intermediate two catalyst zones for intimately mixing vapor and liquid reaction effluent from a first catalyst zone and quench fluid to form a new two-phase vapor-liquid reaction mixture. In addition, reactor internal components are disclosed for evenly distributing the new reaction mixture across the top horizontal cross section of a second catalyst zone.

In this prior art reference, the quench fluid is shown entering a quench zone through a quench nozzle for mixture with the reaction mixture present in the quench zone. No specific details for the quench nozzle construction are given. It is known to provide a quench nozzle construction comprising simply a closed ended conduit having a series of generally downwardly oriented longitudinal exit ports or slots proximate its closed end. The center lines of the slots lie along the centerline of the reactor vessel. An inwardly sloping collector tray, the periphery of which contacts the wall of the reactor vessel below a quench zone, is provided and has an opening concentric with the vertical access with the reactor vessel, for receiving liquid from the quench zone. A mixing means on the upper surface of the collector tray is in axial alignment with and covers the opening in the collector tray and is adapted for mixing and contacting liquid and vapor components from above the collector tray and conveying the mixed vapor and liquid downwardly through the opening in the collector tray. A horizontally disposed dispersing means having a splash plate connected to the collector tray is positioned below and in axial alignment with the collector tray opening for dispersing liquid flowing through the collector tray opening. A liquid distribution means including a perforated distributor tray is attached across the horizontal cross section of the reactor vessel below the collector tray and has a plurality of evenly spaced perforations for the passage of liquid, and a large vapor opening concentric with the vertical axis of the reactor vessel for the passage of vapor. A cylindrical weir surrounds the vapor opening in the perforated tray to prevent liquid flow from the upper surface of the perforated distributor tray through the vapor opening. A second distribution means is attached to the reactor vessel below the liquid distribution means and includes a distributor tray having a plurality of evenly spaced openings with distributor caps covering the distributor tray openings, for evenly distributing vapor and liquid across the horizontal cross section of the reactor vessel second catalyst zone.

U.S. Pat. No. 3,824,081 disclose a substantially similar configuration to that described above further including means to separate any solid particulate contaminants from the reaction mixture prior to the mixture passing into the catalyst zone.

Notwithstanding the significant improvements provided by these devices over the prior art, it has been found that undesirable temperature differentials across the reactor may still occur. As discussed hereinbelow in more detail, the quench fluid exiting the slots in the quench nozzle possesses a horizontal flow component resulting in the quench fluid exiting the slots at an angle and concentrating at the side of the reactor opposite the point at which the quench nozzle enters the reactor vessel. This results in the uneven mixing of quench fluid with the vapor and liquid reaction effluent from the first catalyst zone and radial temperature variations across the reactor, even when these mixtures pass through the interbed mixing device. While the latter is designed with the aim to thoroughly mix the liquid reactant to eliminate any temperature maldistribution in the reaction mixture entering the second catalyst bed, it has been found that such temperature variations can occur especially at low flow rates, due to incomplete mixing and heat transfer in the mixing device. As one skilled in the art will appreciate, such temperature variations in the fluid as it enters the catalyst bed can have a negative effect on the subsequent reaction as well as catalyst life.

Further examples of interbed quench cooling and interzone mixing devices can be found in U.S. Pat. Nos. 3,433,160; 3,541,000; 3,589,541; 3,746,515; 3,787,189; 3,966,420; 4,087,252; 4,133,645; 4,138,327; 4,233,269; 4,378,292; 4,481,105; 4,669,890; 4,808,350; and 5,152,967. Some of these devices are complicated; some are prone to plugging; and some need a relatively large space to provide the desired degree of mixing.

It is, therefore, desirable to provide interbed quench cooling and interzone mixing and redistribution components for a reactor vessel which effect improved introduction of a quench fluid into the vapor-liquid reaction mixture from a first catalyst zone and a more thorough mixing and redistribution of the liquid and vapor reactants to be delivered across the top of the horizontal cross-section of a second catalyst zone.

OBJECTS AND SUMMARY OF THE INVENTIONS

Among the several objects of the present invention, it may be noted: a novel reactor internal configuration which provides more efficient mixing of a quench stream with the vapor-liquid reaction mixture effluent from a first catalyst zone; a novel reactor internal configuration which provides more efficient radial mixing of liquid and vapor reaction mixture across the reactor vessel horizontal cross-section and even redistribution of vapor and of liquid reaction mixture across the horizontal cross-section of a second catalyst zone, and reactor internal components to effect the above which are compact, thus saving reactor volume, and which have no "dead zones" for the accumulation of stagnant liquid. Other objects of the invention will be in part apparent and in part pointed out hereinafter.

According to the present invention, novel internal components for a vertical downflow reactor are disclosed for introducing quench fluid into a vapor-liquid reaction mixture flowing from a first catalyst zone, for mixing and/or intimately contacting vapor and liquid components of a reaction mixture and for evenly distributing the vapor and liquid reaction mixture for delivery across the horizontal cross-sectional area of a succeeding reactor catalyst zone.

The quench fluid introduction means in accordance with one embodiment of the present invention includes a horizontally disposed quench nozzle in the form of a conduit extending radially inwardly into a quench zone between two succeeding catalyst zones. The conduit is capped at one end and has a series of generally downwardly oriented longitudinal exit ports or slots disposed proximate its capped end. The centerline of the slots fall along the vertical centerline of the reactor. A horizontal baffle plate is positioned within the conduit proximate its closed end and is constructed and arranged to bifurcate the quench fluid stream as it flows in the conduit and before the stream reaches the exit slots. One stream flows over the upper face of the baffle plate and one flows under the lower face of the baffle. The upper stream will impact the closed end of the conduit and change direction to flow beneath the baffle. The two quench fluid streams will meet substantially at the centerline of the longitudinal slots and exit the quench nozzle. In this manner, the horizontal component of the quench fluid flowing from the slots is substantially reduced, if not completely eliminated, and the quench fluid is distributed more axisymmetrically within the quench zone.

Preferably the trailing edge of the horizontal baffle plate, that is, the edge facing the closed end of the conduit, must extend beyond the trailing edge of the slots a distance at least equal to the diameter of the conduit, and in addition, should be spaced at least one conduit diameter from the closed end of the conduit.

In an alternative embodiment, the conduit has a downwardly extending conduit or leg proximate its closed end to form a "tee" configuration. The leg preferably is the same diameter as the conduit; its length is at least one conduit diameter; and its axial centerline lies substantially along the vertical centerline of the reactor. There is no internal baffle in this configuration. The flow of quench fluid is blocked by the closed end of the "tee", is reversed and passes from the downwardly extending conduit into the quench zone. Again, the horizontal component of the gas is reduced, if not substantially eliminated and is introduced more evenly, that is axisymmetrically, into the quench zone.

The invention also is directed to an interzone mixing apparatus in vertical communication with the bottom of the quench zone. An inwardly sloping collector tray, the periphery of which contacts the wall of the reactor vessel below the quench zone, has an opening concentric with the vertical axis of the reactor vessel for receiving liquid from the quench zone. A weir configuration may be provided on the collector tray to add residence time of the liquid on the tray and to initiate mixing. A mixing means is provided on the upper surface of collector tray in axial alignment with and covering the opening in the collector tray for mixing and contacting liquid and vapor components entering from above the collector tray and conveying the mixed vapor and liquid downwardly through the opening in the collector tray. A flow deflection means is positioned immediately below the collector tray opening for directing liquid flow towards the axial centerline of the reactor. A horizontally disposed collection means in the form of a collection pan is connected to the collector tray below and axially aligned with the collector tray opening for collecting liquid flowing through the collector tray opening. The collection pan is provided with a liquid dispersing means comprising a radially outwardly flared downwardly extending skirt to divert the liquid flow toward the reactor walls as it passes from the collection pan onto a perforated tray, then onto a distributor tray positioned above the second catalyst zone, through which the vapor and liquid may be delivered to the horizontal cross-section of a reactor vessel second catalyst zone in a conventional manner.

The inventions accordingly comprise the constructions hereinafter described, the scope of the invention being indicated in the claims.

BRIEF DESCRIPTION OF THE DRAWINGS

The above and other significant objects and advantages of our invention are believed to be made clear by the following detailed description thereof, taken in conjunction with the accompanying drawings wherein.

Corresponding reference numerals indicate corresponding parts throughout the several views of the drawings.

DETAILED DESCRIPTION OF THE INVENTIONS

The inventions will now be described with reference to their use in a multi-bed, catalytic reactor in which the quench nozzle and interzone mixing devices are located in a zone between two catalyst beds. The quench nozzle and the interzone mixing devices of the present invention, of course, can be used in non-catalytic vessels or reactors, if so desired.

Although the novel reactor internal configurations disclosed herein are discussed in the singular, it is within the contemplation of the present invention that more than one such quench nozzle or interzone mixing device may be employed in a reactor vessel having a plurality of catalyst zones and two or more quench zones.

Figure 1:
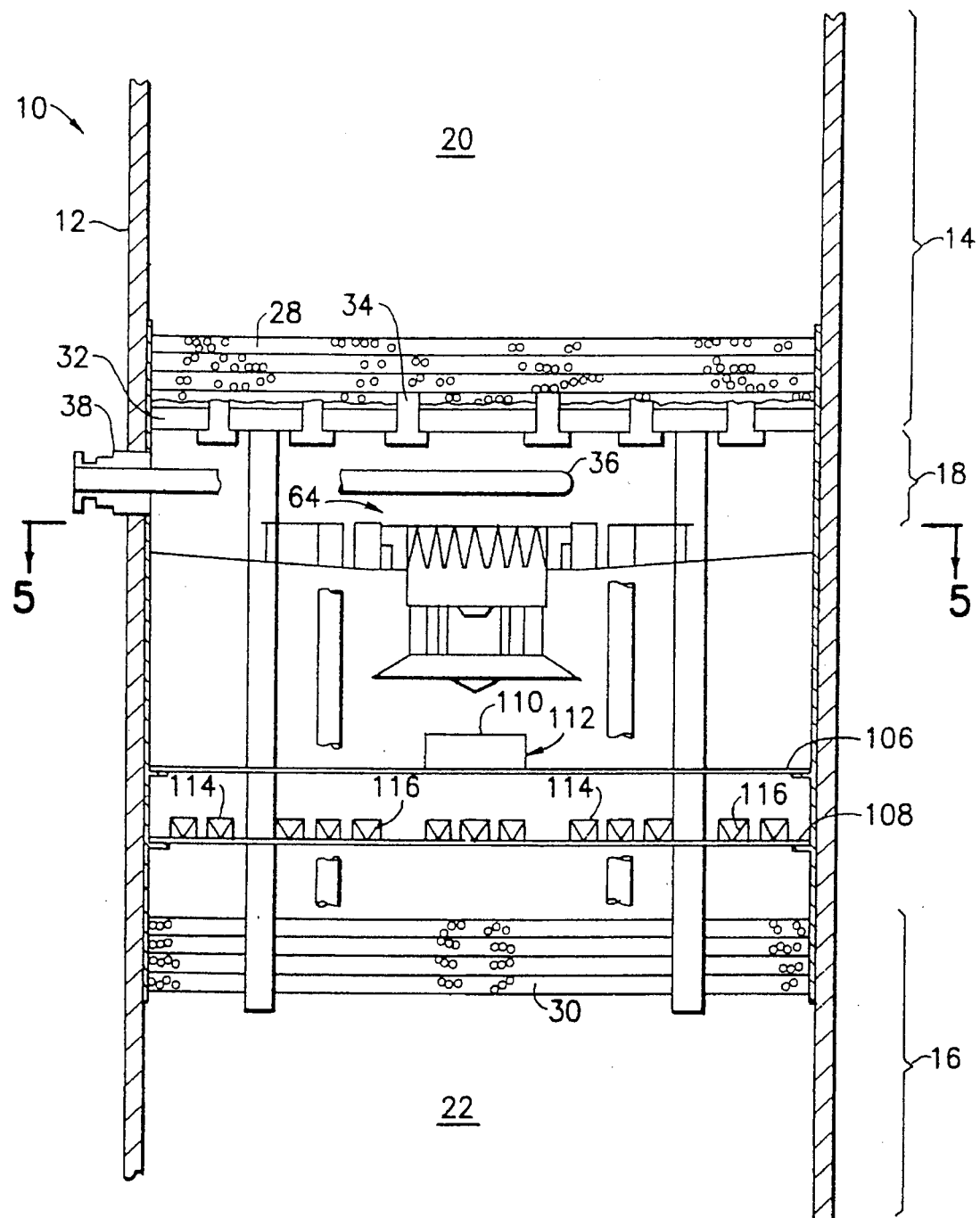
FIG. 1 is a vertical sectional view of a downflow vertical reactor containing at least two catalyst beds and having a quench nozzle and interzone mixing apparatus in accordance with the present inventions.

Referring now to FIG. 1 of the drawings, reference number 10 indicates generally a fluid downflow multi-bed catalytic reactor or vessel having a vertical cylindrical sidewall 12 enclosing a plurality of beds of catalyst. Only those components of primary interest with respect to the inventions are shown. Thus, the drawings do not illustrate all of the mechanical elements, i.e., pumps, valves, sensors, required for the processes to which such reactors are adapted. All these elements may have any known, conventional form which can be readily realized by one of normal skill in the art having knowledge of the information hereinafter given. For example, reference should be had to the above referenced U.S. Pat. No. 3,824,080 for a detailed description of a typical downflow reactor, which description is incorporated by reference herein. For the sake of brevity, such a detailed description will be omitted from this discussion.

The vessel 10 therefore, has an upper fluid inlet (not shown) and a lower fluid outlet (also not shown) for introducing a fluid stream for downward flow through the vessel and ultimate removal of the stream after its passage through the vessel. As shown in FIG. 1, the reactor vessel includes two catalyst zones, referred to generally as 14 and 16, and a quench zone 18 therebetween. Catalyst zone 14 includes a catalyst bed of a solid particulate catalyst is referred to generally by reference numeral 20. Similarly, catalyst zone 16 includes a catalyst bed 22. As is known in the art, a plurality of ceramic balls, Raschig rings or the like are disposed on top and bottom of the catalyst beds to aid in the distribution of gases and liquids as they enter and exit the bed and also to prevent catalyst particles from being disturbed from the position in which they were placed when the vessel was loaded with catalyst. For example, catalyst bed 20 includes layers 28 of inert balls at its base, and catalyst bed 22 includes layers of inert balls 30 at its top. The catalyst particles and inert balls are supported within the reactor vessel by means of a support 32 and transverse beams 34 as shown. The support 32 may be a perforated plate, a grid covered with screening or the like, which will permit fluid to exit the bottom of the catalyst bed. Thus, each of the multiple catalyst beds within the vessel comprise catalyst particles, a lower support layer and an upper covering layer.

During operation of a process employing the reactor described herein, a vapor-liquid reaction mixture flows through the first catalyst zone 14 intimately contacting the solid catalyst, wherein the reaction mixture is at least partially reacted to form desired reaction products. A reaction for which the reactor internal parts of the present invention are designed is an exothermic reaction which liberates heat and increases the temperature of the reaction mixture in first catalyst zone 14.

The reaction mixture comprising vapor and liquid phases passes from the first catalyst zone 14 in FIG. 1 through catalyst support means 32 into the quench zone 18. Such reaction mixture is at an elevated temperature from the adsorption of heat of reaction evolved in first catalyst zone 14. Also, the reaction mixture may be depleted in one or more reactant components and contains a substantial proportion of reaction products.

The quench zone 18 includes a quench nozzle referred to generally by reference numeral 36 in FIG. 1 which passes through a connector 38 in the reactor wall, for introducing and mixing a secondary fluid from an external source (not shown), with the partially reacted process fluid exiting from the catalyst zone 14. As discussed hereinabove and as is generally known in the art, the quench fluid typically has a lower temperature than the process stream and is introduced to control the temperature of the process fluid as it enters the next catalyst bed. The quench fluid may also be added for adjusting the composition of the process stream prior to its entry into the next catalyst bed.

The quench fluid may be selected from either vapor or liquid materials and may comprise a fluid substantially inert under the reaction conditions within reactor vessel 10 or may comprise one or more of the reactant components of the reaction mixture. Preferably, the quench fluid is selected from a vapor component of the reaction charge mixture. For example, in hydrotreating reactions, hydrogen gas is a preferred quench fluid because, in addition to reducing the temperature of reaction mixture effluent from the first catalyst zone 14, such hydrogen gas replaces hydrogen reactant consumed in the hydrotreating reaction.

For quench fluid to effectively reduce the temperature of the hot reaction mixture, it is necessary that the quench fluid intimately contact both the vapor phase and liquid phase components of the reaction mixture. Preferably, the quench fluid should be introduced symmetrically into the quench zone to eliminate ununiform cooling of the liquid and vapor reaction mixtures.

Figure 2:
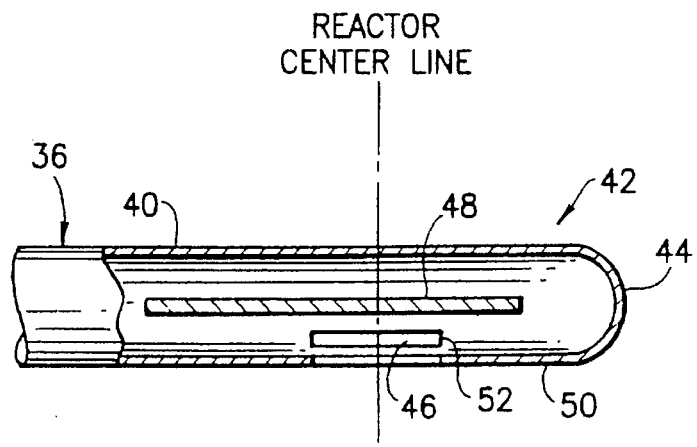
FIG. 2 is a partial sectional view of a quench nozzle in accordance with one embodiment of the present invention.
Figure 3:
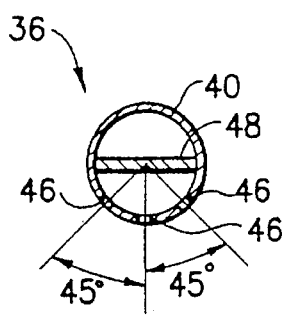
FIG. 3 is a sectional view taken along line 3—3 of FIG.

A quench nozzle incorporating one embodiment of the present invention is shown in FIG. 2 and 3, and includes a quench tube or conduit 40, which extends radially inwardly beyond the vertical centerline of the reactor. The conduit 40 is closed off at its end 42 by cap 44 as shown. The conduit 40 is provided with a series of quench fluid exit ports in the form of longitudinal slots 46 having centerlines lying along the centerline of the vessel, which are arranged to direct quench fluid exiting the slots in a generally downward direction into the quench zone. The slots may be three in number with one lying on the vertical centerline of the conduit, and each of the other offset 45° from the vertical as best seen in FIG. 3. The quench nozzle as just described is of a conventional design. It was found, however, that quench fluid introduced into the quench zone through such a quench nozzle had a horizontal velocity or force component that carried it towards the area of the quench zone opposite the point the quench nozzle entered the quench zone. This resulted in uneven cooling and temperature variations across the quench zone. Specifically, the vapor and liquid mixture in the areas opposite the point of entry of the quench nozzle were cooler than near the point of entry. To alleviate this problem, an internal horizontal baffle plate 48 was positioned within the conduit 40 to bifurcate the quench fluid stream as it flows towards the closed end of the conduit before reaching the slots. Preferably, the leading edge of the baffle, that is, the edge facing into the flow of quench fluid, is spaced from the leading edge of the longitudinal slots a distance equal to three times the length of the slots. The stream flowing over the baffle plate 48 strikes the cap 44 and is diverted beneath the baffle plate 48 and back towards the longitudinal slots to mix with the lower stream passing beneath the baffle plate and exit the conduit through longitudinal slots. In this way, the horizontal component of the quench fluid is substantially reduced and the quench fluid is distributed more evenly and axisymmetrically within the quench zone.

We have found that for there to be a substantial nullification of the horizontal flow component of the quench stream exiting the conduit, the positioning of the baffle plate with respect to the exit slots is critical. Specifically, the trailing or downstream edge 50 of the baffle plate must extend beyond the downstream edge 52 of each slot 46 a distance at least equal to the internal diameter of the conduit 40. Furthermore, the trailing edge 50 should be spaced a distance equal to at least one conduit diameter from the end of the conduit to minimize pressure drop.

A further advantage of the quench nozzle just described is that it is designed for easy installation in existing vessels where the quench nozzle is simply the capped conduit with slot design just described. The existing quench nozzle is simply removed and replaced by the quench nozzle configuration 36.

Figure 4:
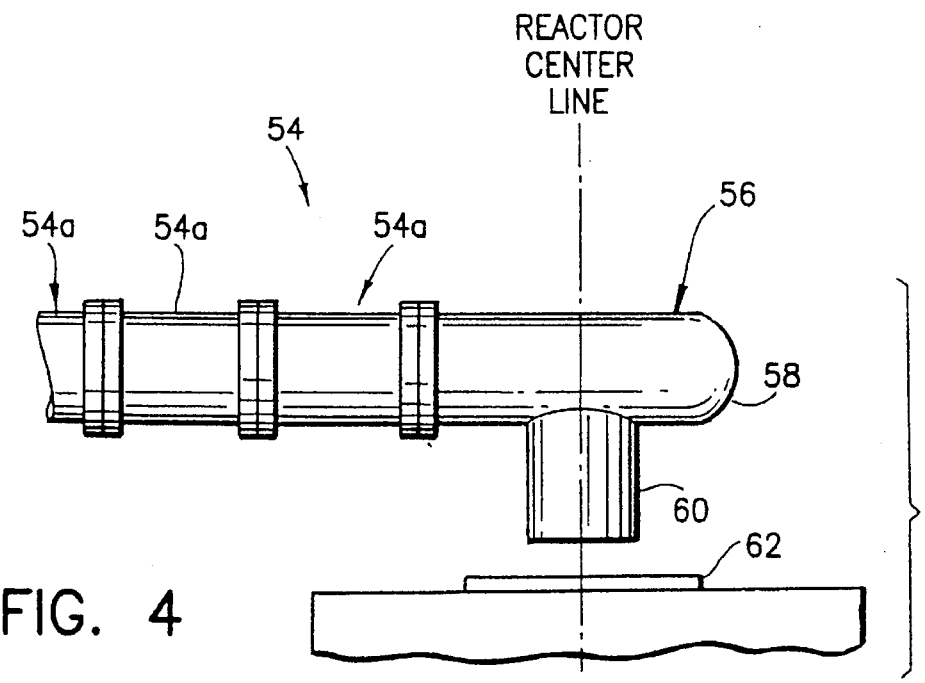
FIG. 4 is an elevational view of a quench nozzle in accordance with an alternative embodiment of the present invention.

An alternate quench nozzle configuration is illustrated in FIG. 4 and identified by reference numeral 54. The quench tube 54 may comprise one or more flanged sections 54a, and terminate in a "tee" 56. The quench nozzle may be assembled in several pieces to permit removal from the reactor interior and relocating for catalyst loading. The horizontal leg of the "tee" is capped at 58 as shown. The downwardly oriented leg 60 of the "tee" acts as the quench nozzle outlet and has the same diameter as the quench tube 54 with its centerline falling along the vertical centerline of the reactor. The leg 60 directs the quench fluid onto a wear plate 62 positioned on a collector tray cap centered under the quench fluid nozzle outlet and is distributed symmetrically into the quench zone. There is no horizontal baffle in this embodiment; however, the horizontal component of the quench fluid exiting the leg 60 is substantially eliminated. We have also found that this "tee" configuration is most effective when the leg 60 is at least one conduit diameter in length and its centerline is spaced from the end 58 a distance at least equal to the internal diameter of the conduit 54.

Figure 5:
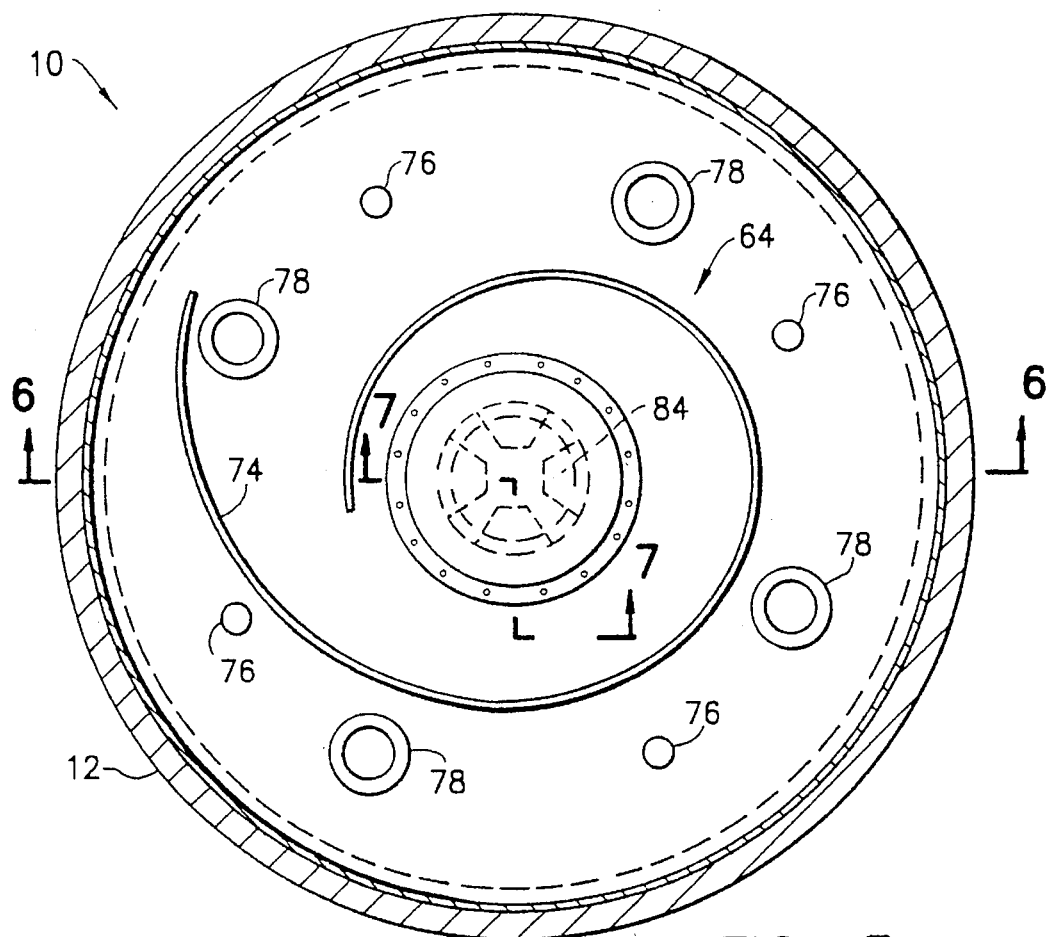
FIG. 5 is a partial sectional view taken along line 5—5 of FIG. 1.
Figure 6:
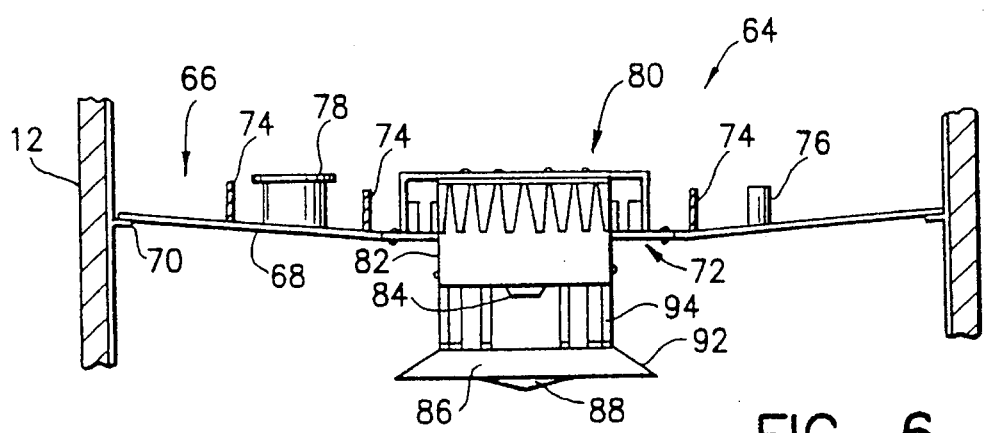
FIG. 6 is a partial view taken along line 6—6 of FIG. 5.

An interzone mixing apparatus is provided to effect thorough uniform mixing and redistribution of the liquid and vapor reaction components as they pass from the quench zone 18. With reference to FIGS. 1, 5 and 6, the interzone mixing apparatus of the present invention, is identified generally by the reference numeral 64 and includes collector tray 66, which receives the liquid phase components of the reaction mixture leaving quench zone 18. As can be seen best in FIG. 6, the collector tray 66 includes an inwardly sloping tray panel 68 which is supported along its outer periphery by tray support rings 70 to which it is attached by any suitable attachment means. The tray panel 68 slopes inwardly and downwardly from its periphery towards the center of reactor vessel, and is provided with circular opening 72 concentric with the vertical axis of reactor vessel. The inward slope of the tray panel 68 is sufficient for ready liquid flow on its upper surface toward the centrally located opening 72. Slopes having a drop to run ratio of from about 1:4 to about 1:16 are effective to allow ready flow of liquid on the upper surface of the tray panel. Preferably, the slope is 1:12. A vertical spiral weir 74 may be provided on the surface of the tray panel to add residence time to the liquid on the tray and to utilize the collector tray surface for initiating mixing of the liquid. (Note that weir 74 is not shown in FIG. 1 to preserve clarity.) Preferably, the height of the weir is calculated to be higher than the liquid level on the tray panel and typically is approximately six inches. The tray panel also has appropriate thermocouple guides 76 and catalyst drains 78 as is known in the art.

Liquid flowing down the tray panel 68 and vapor from quench zone 18 enter a mixing means 80 wherein the vapor phase and liquid phase are brought into intimate contact to ensure good heat transfer between the phases. Mixing means 80 is located upon the upper surface of the collector tray panel 68 and is concentric with the vertical center line of reactor vessel, covering the opening 72 in tray panel.

Figure 7:
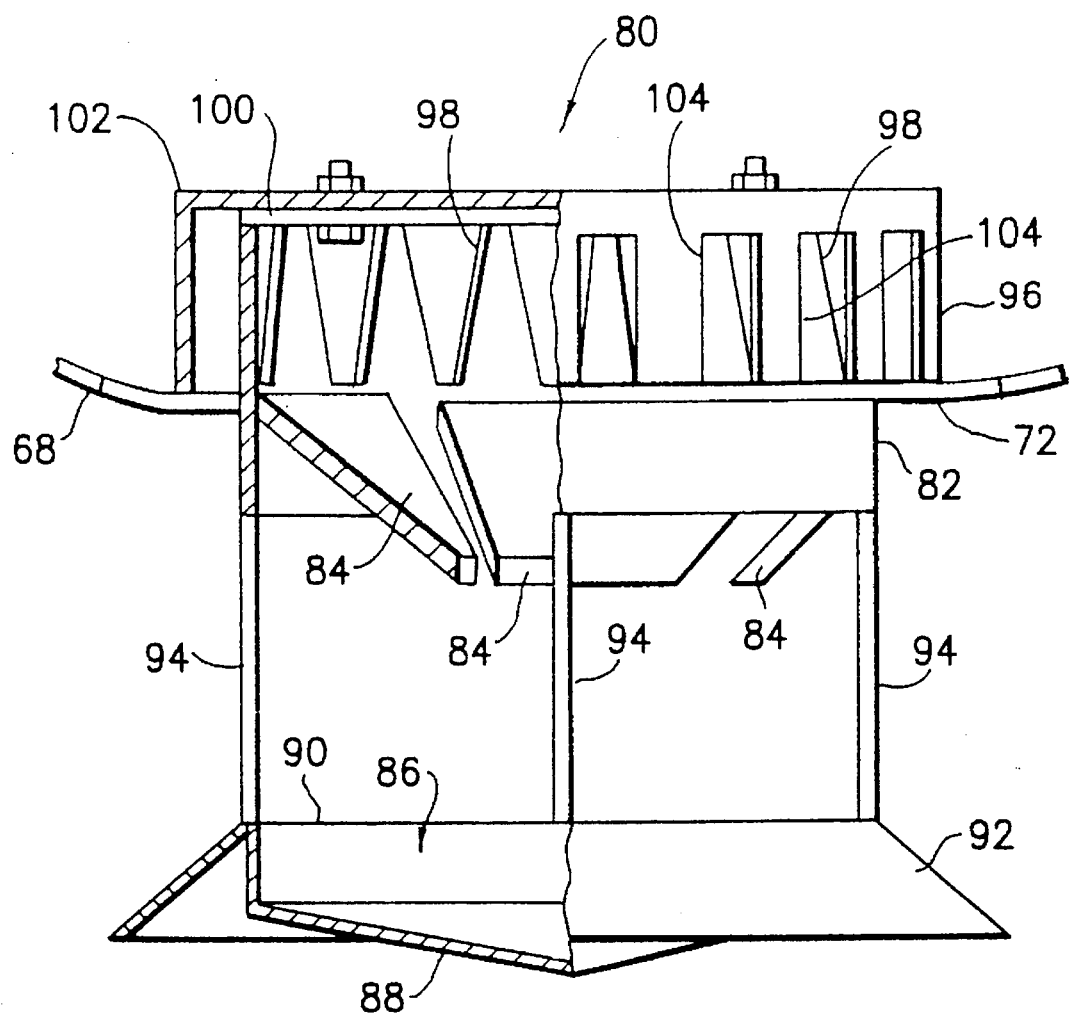
FIG. 7 is a partial sectional view taken along line 7—7 of FIG. 5.

With reference to FIGS. 6 and 7, the vapor and liquid phases pass through the opening 72 in collector tray panel 68 into a mixer downcomer 82. The liquid phase from mixer downcomer 82 passes downwardly over inwardly oriented deflector means 84 in such a manner that the liquid phase is directed towards the vertical center of the reactor, and into a collection pan 86. The deflector means may take the form of four pie-shaped plates as shown, sloping downwardly at an angle of between about 30° to about 60°, preferably about 45° from the horizontal. The four pie-shaped plates may be configured so that, collectively, they occupy between 25 to 75 percent of the concentric circular opening 72 in the tray panel 68.

The collection pan 86 is located at a distance spaced below and concentric with mixer downcomer 82 and has a shape effective for collecting the downward flowing liquid from the deflector means 84 to improve mixing, especially at low flow rates. Preferably, collection pan 86 comprises a cone 88 with a downward facing apex, the cone having substantially the same radius as mixer downcomer 82, and a peripheral weir 90 which acts as a sidewall to provide residence time for liquid captured in the pan to enhance mixing and heat transfer. The collection pan 86 may further include a skirt 92. The collection pan 86 is maintained in a spaced, concentric relationship to mixer downcomer 82 by a plurality of connecting members 94. The vapor phase materials exit the mixer downcomer 82 through the space between mixer downcomer 82 and collection pan 86. Liquid phase materials will collect in the collection pan 86 until the liquid level rises above the weir 90, at which time liquid will flow over the weir and downwardly over the skirt 92 which will divert the liquid toward the reactor walls to better disperse the liquid on to the perforated plate and ultimately to the catalyst bed below.

The mixing means 80 is of the type described in U.S. Pat. No. 3,824,080 and the details of its construction are best seen in FIG. 7. Mixer downcomer 82 extends through the concentric opening 72 in the tray panel 68 such that a portion of downcomer extends above the upper surface of tray panel 68 and a portion of downcomer extends below the lower surface of tray panel 68. A collector cap 96 is situated upon the upper surface of tray panel 68 and encompasses the portion of mixer downcomer 82 which extends above the upper surface of the tray panel. Mixer cap 96 and the upper portion of mixer downcomer 82, in association, comprise the mixing means 80. Mixer downcomer 82 includes a hollow cylindrical structure having a serrated upper edge forming a plurality of tapered prongs 98 upon the upper portion thereof. The tapered prongs 98 define a plurality of tapered slots extending from a point intermediate to the upper end of the cylindrical wall of downcomer 82. The bottom of the tapered slots are substantially even with the upper surface of tray panel 68. A flat circular plate 100 attachment forms the upper end of mixer downcomer 82 and is attached thereto by any convenient attachment means, such as welding. Mixer cap 96 includes a hollow cylindrical body open at the bottom and closed at the top by a circular plate 102. The mixer cap 96 rests upon the upper surface of tray panel 68 encompassing the portion of mixer downcomer 82 which extends above the surface of tray panel 68. The bottom surface of circular plate 102 rests upon the upper surface of circular plate 100. Circular plate 102 and circular plate 100 are maintained in this association by a plurality of connector means, such as bolts. The inside diameter of mixer cap 96 is larger than the outside diameter of mixer downcomer 82, forming an annular space therebetween. A plurality of rectangular prongs 104 extending from a point intermediate to the height to the bottom edge of mixer cap 96 form a plurality of rectangular slots extending from a point intermediate to the height to the bottom edge of mixer cap 96. Preferably the tops of the rectangular slots are substantially even with the top edge of the tapered prongs 98 of mixer downcomer 82, although the tops of the rectangular slots may be located somewhat lower. Mixer downcomer 82 and mixer cap 96 are in such spacial alignment that the tapered prongs are in radial alignment with the rectangular slots, which alignment forces impingement of liquid and vapor flowing through the rectangular slots onto the tapered prongs, thereby inducing intimate mixing of the liquid and vapor phases.

Spaced below the collection pan 86 is a perforated tray 106 and below that, a distribution tray 108, which span a horizontal cross-sectional area of reactor vessel 1. The specific details of construction of the perforated tray and distribution tray are being omitted from this discussion, as they play no critical part in the subject inventions. The construction of these components is well known to those skilled in the art and reference can be had, for example, to the abovenoted U.S. Pat. No. 3,824,080 for a detailed description.

In general, the liquid phase flowing from the collection pan 86 is distributed evenly upon the upper surface of tray 106 aided by skirt 92 and flows through evenly distributed perforations (not shown) in the tray 106 in such a manner that liquid flow is substantially evenly distributed across the horizontal cross-sectional area of reactor vessel 10. Vapor phase from mixer downcomer 82 passes through a concentric opening 110 provided, in the perforated tray 106. Cylindrical weir 112 prevents liquid upon the surface of perforated tray 106 from flowing through the concentric opening therein.

Liquid from perforated tray 106 collects upon the upper surface of distributor tray 108 and then flows through openings 116 in the series of distributor caps 114. Vapor from above perforated tray 106 flows through the aforenoted opening 110 in tray 106 and through openings 116 in distributor caps 114 along with the liquid.

The vapor phase and liquid phase flowing through the openings in distributor tray 108 are substantially evenly distributed across the horizontal cross-section of a second catalyst zone 16 of reactor vessel 10. The vapor phase and liquid phase components of the reaction mixture pass downward through the second catalyst zone wherein the reactants may undergo additional reaction in the presence of solid particulate catalyst to form additional amounts of desired reaction product.

Cold flow modeling studies were conducted to determine if the quench fluid introduction means of the present invention reduces the creation of horizontal temperature variations in the quench zone as noticed with the prior art configuration, and if the interzone mixing assembly of the present invention resulted in more even distribution of the vapor and liquid mixture across the reactor as compared to the prior art.

A model hydrotreating reactor was fabricated at half scale. It was virtually entirely in clear acrylic (42" I.D. full round) and featured a vapor distributor, liquid distributor, perforated tray, collector tray, additional perforated tray and distributor tray, simulated thermowell tubes, quench nozzle, circulating pump, and flow metering devices. The construction as intended to simulate distribution through a reactor such as that disclosed in the aforementioned U.S. Pat. No. 3,824,080. The liquid and gas flow rates were chosen to simulate operating ranges of most operating units. Specifically, water flow rates varied from 20 to 100 gpm; air flow rates to the top distributor varied between 120 and 240 cfs; and the flow of quench nozzle fluid varied from between 0 and 110 cfs.

Our experiments demonstrated that quench fluid exiting a prior art quench nozzle, i.e., the single conduit with longitudinal slots configuration, had a significant horizontal velocity component, exited at roughly a 45° angle and tended to flow towards the side of the quench zone opposite the point of entry of the quench nozzle through the reactor wall. We found that the quench fluid exiting the quench nozzle with the horizontal baffle plate had little horizontal velocity and was distributed substantially symmetrically into the quench zone.

The experiments further demonstrated that the interzone mixing device of the prior art, i.e., based on that disclosed in U.S. Pat. No. 3,824,080 did not thoroughly mix and redistribute the liquid, especially at low flow rates. The interzone mixing assembly of the present invention achieved more thorough mixing and distribution of liquid.

Obviously, the precise dimensions of the various zones, openings, conduits and the like in the interzone mixing device of the present invention, along with the number and dimensions of the openings in the perforated tray and distribution tray, will depend upon various factors such as permissible pressure drop, the space between the beds available for the reactor internal components and the like.

Some advantages of the present invention evident from the foregoing description include a quench fluid introduction means which provides improved distribution of the quench fluid in the liquid and vapor reaction mixture flowing from a first catalyst bed and an interzone mixing device which provides more uniform mixing and redistribution of liquid reactant and vapor reactant to succeeding process zones.

In view of the above, it will be seen that several objects of the invention are achieved, and other advantageous results obtained.

As various changes can be made in the above constructions without departure from the scope of the invention, it is intended that all matter contained in the above description, or shown on the accompanying drawings, shall be interpreted as illustrative, not in a limiting sense.

What is claimed is:

1. In an interzone mixing assembly for mixing and intimately contacting vapor and liquid in a downflow reactor vessel defined by a cylindrical wall wherein the assembly comprises:
   (i) an inwardly sloping collector tray peripherally sealed to the cylindrical wall of said reactor vessel and having a central opening concentric with the vertical axis of said reactor vessel;
   (ii) a mixer downcomer having an elongated hollow member having a serrated upper edge forming a plurality of tapered prongs defining a plurality of tapered slots, extending vertically through the central opening in said collector tray wherein the bottom of the tapered prongs are substantially even with the upper surface of said collector tray and wherein the wall of said mixer downcomer is sealed to the periphery of the central opening in said collector tray;
   (iii) a cover plate attached to the upper end of said mixer downcomer;
   (iv) a hollow, elongated mixer cap mounted on the upper surface of the collector tray, said mixer cap being closed at the top, having a slotted lower edge forming a plurality of rectangular prongs defining a plurality of rectangular slots, the inner wall of said mixer cap and the outer wall of said mixer downcomer forming an annular space, and the rectangular slots in said mixer cap being radially aligned with the tapered prongs of said mixer downcomer; and
   (v) attachment means for attaching the mixer downcomer to the mixer cap; said mixer downcomer, cover plate and mixer cap defining a mixing means;

the improvement in combination therewith comprising:
   a flow deflector means in said mixing means to direct flow of liquid through said mixing means toward the vertical axis of said reactor vessel.

2. The interzone mixing assembly as claimed in claim 1 wherein said flow deflector means comprises a set of downwardly sloping plates positioned within said mixing means and occupying approximately 25 to 75 percent of the central opening in the collector tray.

3. The interzone mixing assembly as claimed in claim 2 wherein said set includes four plates.

4. The interzone mixing assembly as claimed in claim 2 wherein said plates slope downwardly at an angle from about 30° to about 60° from the horizontal.

5. The interzone mixing assembly as claimed in claim 4 wherein said plates slope downwardly at an angle of about 45°.

6. In a vertical downflow reactor for reacting a vapor and liquid mixed phase reaction mixture including a vertical reactor vessel defined by a cylindrical wall having inlet means, a first catalyst zone below said inlet means, a quench zone below said first catalyst zone, a second catalyst zone below said quench zone and an outlet means below said second catalyst zone, an inwardly sloping collector tray peripherally attached to the wall of said reactor vessel immediately below said quench zone having an opening concentric with the vertical centerline of said reactor vessel for collecting liquid passing downwardly from said quench zone, a mixing means upon the upper surface of said collector tray for mixing and intimately contacting liquid and vapor from above said collector tray and conveying said mixed vapor and liquid through said collector tray, and a horizontally disposed perforated tray beneath said collector tray and above said second catalyst zone adapted to pass said vapor and liquid therethrough, the improvement in combination therewith comprising a flow deflector means in said mixing means to direct flow of liquid through said mixing means toward the vertical axis of said reactor vessel.

7. The vertical downflow reactor as claimed in claim 6 wherein said flow deflector means comprises a set of downwardly sloping plates positioned within said mixing means and occupying approximately 25 to 75 percent of the central opening in the collector tray.

8. The vertical downflow reactor as claimed in claim 2 wherein said set includes four plates.

9. The vertical downflow reactor as claimed in claim 2 wherein said plates slope downwardly at an angle of from about 30° to about 60° from the horizontal.

10. The vertical downflow reactor as claimed in claim 4 wherein said plates slope downwardly at an angle of about 45°.

* * * * *